United States Patent [19]

Hennig et al.

[11] 4,152,059
[45] May 1, 1979

[54] COLLAPSIBLE CAMERA

[75] Inventors: Fridolin Hennig, Zorneding; Adam Hummel, Munich, both of Fed. Rep. of Germany

[73] Assignee: AGFA-Gevaert, A.G., Leverkusen, Fed. Rep. of Germany

[21] Appl. No.: 827,170

[22] Filed: Aug. 24, 1977

[30] Foreign Application Priority Data

Aug. 25, 1976 [DE] Fed. Rep. of Germany ....... 2638297

[51] Int. Cl.² .................. G03B 1/18; G03B 17/50; G03B 13/02
[52] U.S. Cl. .................... 354/173; 354/86; 354/199
[58] Field of Search .............. 354/83, 86, 288, 187, 354/173, 212, 213, 195, 199

[56] References Cited

U.S. PATENT DOCUMENTS

| | | | |
|---|---|---|---|
| 3,517,597 | 6/1970 | Rauffer | 354/199 X |
| 3,522,764 | 8/1970 | Biber et al. | 354/195 |
| 3,872,485 | 3/1975 | Asano | 354/83 |
| 3,936,850 | 2/1976 | Goto | 354/212 |
| 3,965,480 | 6/1976 | Eloranta | 354/83 |
| 4,030,111 | 6/1977 | Kimura | 354/213 X |
| 4,081,809 | 3/1978 | Kuboshima | 354/199 |

FOREIGN PATENT DOCUMENTS 1042376 10/1958 Fed. Rep. of Germany ........... 354/173

*Primary Examiner*—Donald A. Griffin
*Attorney, Agent, or Firm*—Michael J. Striker

[57] ABSTRACT

A collapsible instant-picture camera has a flat box-shaped housing the front side of which is provided with a recess. The latter is flanked within the housing by a camera-drive compartment at its one lateral side and a battery compartment at its other lateral side. A lens mount is connected to the camera housing and movable relative to the same between an operating position in which it is located forwardly of the housing and a rest position in which it is received within the recess and located between the drive and battery compartments.

6 Claims, 5 Drawing Figures

COLLAPSIBLE CAMERA

BACKGROUND OF THE INVENTION

1. Field of the Invention

The invention relates to a photographic camera, particularly a collapsible photographic camera.

More particularly, the invention relates to a collapsible instant-picture photographic camera.

2. The Prior Art

Collapsible cameras per se are well known. Also known are collapsible instant-picture cameras, i.e., cameras of the type using self-developing film which is supplied in form of individual self-developing film sheets which are stored in, and withdrawn seriatim from, a film cassette.

In the early cameras of the self-developing type the withdrawal of each film sheet from the cassette, and its transportation to the outside of the camera, was effected manually. For this purpose pull-tabs were provided for the respective film sheets; these tabs were gripped by a user and pulled out of the camera to thereby transport the film sheet.

Such cameras are still available. However, in recent years instant-picture cameras have become known wherein the transportation of the film sheets is effected by a film transporting mechanism which is driven by an electric motor. The housing of these cameras has a film chamber for the film cassette, and the motor for the drive is accommodated in the housing either behind or above the film chamber.

These prior-art cameras have certain disadvantages. Because of the location of the motor and of the batteries which supply it with electrical energy, their housings are relatively bulky; this is undesirable not only from an aesthetic point of view but also because large-size cameras are disliked by the public at a time when in all other types of cameras there is a pronounced trend towards ever smaller dimensions so as to make the cameras easy to carry along. Furthermore, those additional portions of the housing (and hence of the overall bulk of the camera) which are required to accommodate the motor and batteries do not contribute to the ease of operation of the camera in any way. Also, when a cassette is received in the film chamber, the prior-art cameras as a rule do not permit access to the battery space (for inspection and/or replacement of the batteries) because the space is open to the film chamber and light could enter the latter and ruin the film sheets therein and/or because the film cassette blocks access to the battery space.

SUMMARY OF THE INVENTION

It is an object of the present invention to overcome the prior-art disadvantages.

More particularly, it is an object to provide an improved instant-picture camera having a motor-driven film transporting mechanism and avoiding the prior-art disadvantages.

Another object is to provide a camera of the type under discussion wherein the housing portions of the camera which accommodate the motor and the power source for the same serve as gripping portions by means of which the user can hold the camera firmly and with ease.

Still a further object is to provide such a camera wherein the space accommodating the power source (e.g., one more batteries) is freely accessible even when the film chamber contains a film cassette.

A concomitant object is to provide a camera of the type under discussion herein, which in the rest position requires only a relatively small amount of space and is of aesthetically pleasing appearance.

Yet a further object is to provide such a camera wherein the motor-drive can be coupled, at the option of a user, with an arrangement for setting the camera lens and/or viewfinder for different focal lengths (distances to the object being photographed).

In keeping with these objects, and with others which will become apparent hereafter, one feature of the invention resides in a camera, particularly an instant-picture camera, which (briefly stated) may comprise a camera housing having a front side provided with a recess; a camera-drive compartment and a battery compartment flanking the recess at opposite lateral sides thereof; and a lens mount connected to the camera housing and movable relative to the same between an extended position in which the lens mount is located forwardly of the front side, and a retracted position in which the lens mount is retracted into the recess of the front side and is located between the compartments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

THE STRUCTURE OF FIGS. 1-3

Figure 1:
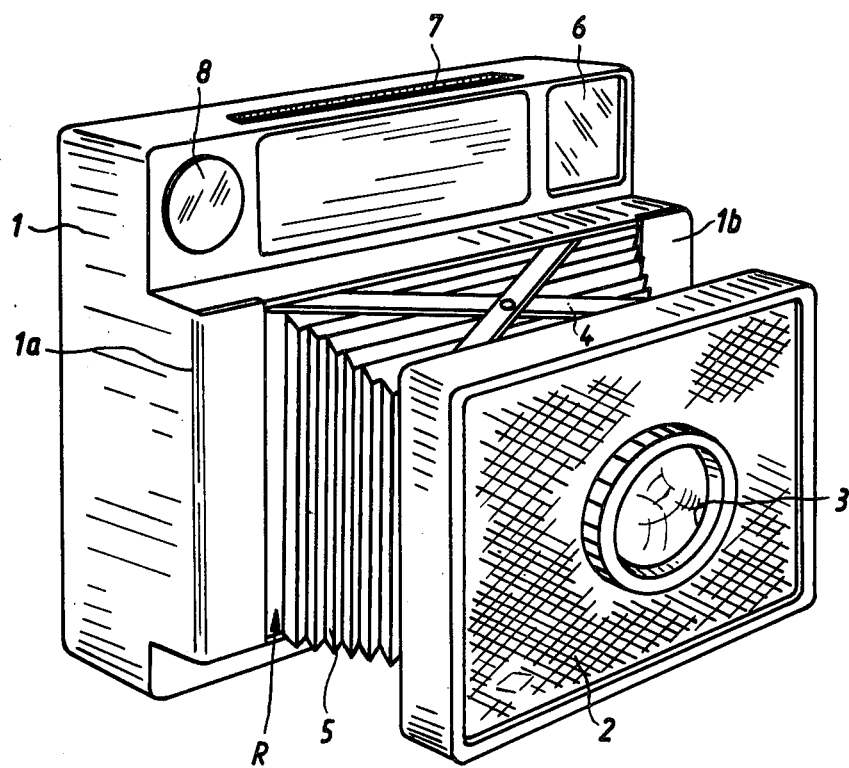
FIG. 1 is a perspective view, showing a camera according to one embodiment of the invention, in operative position.
Figure 2:
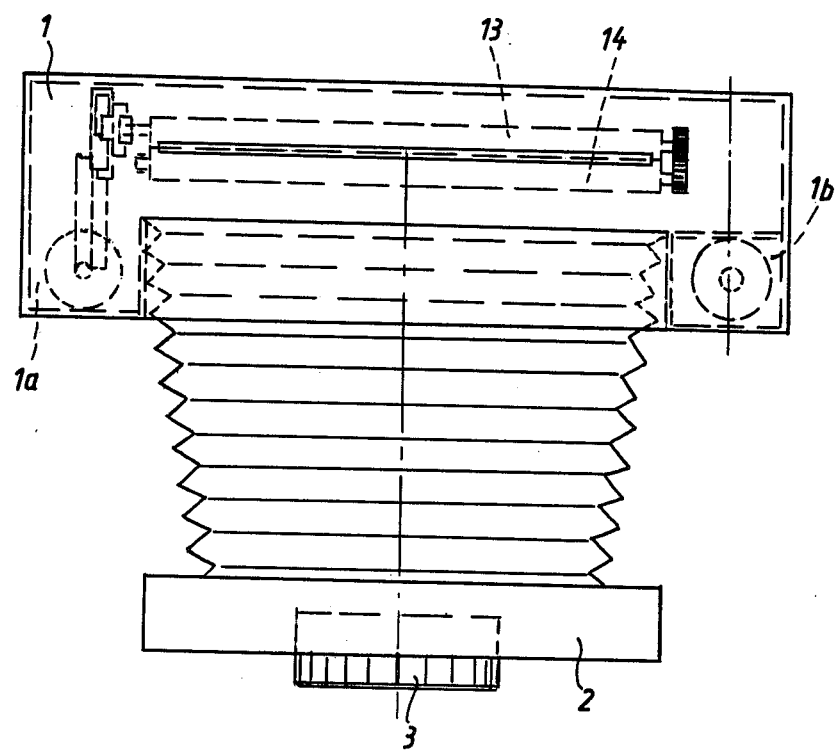
FIG. 2 is a top-plan view of the camera in FIG. 1.
Figure 3:
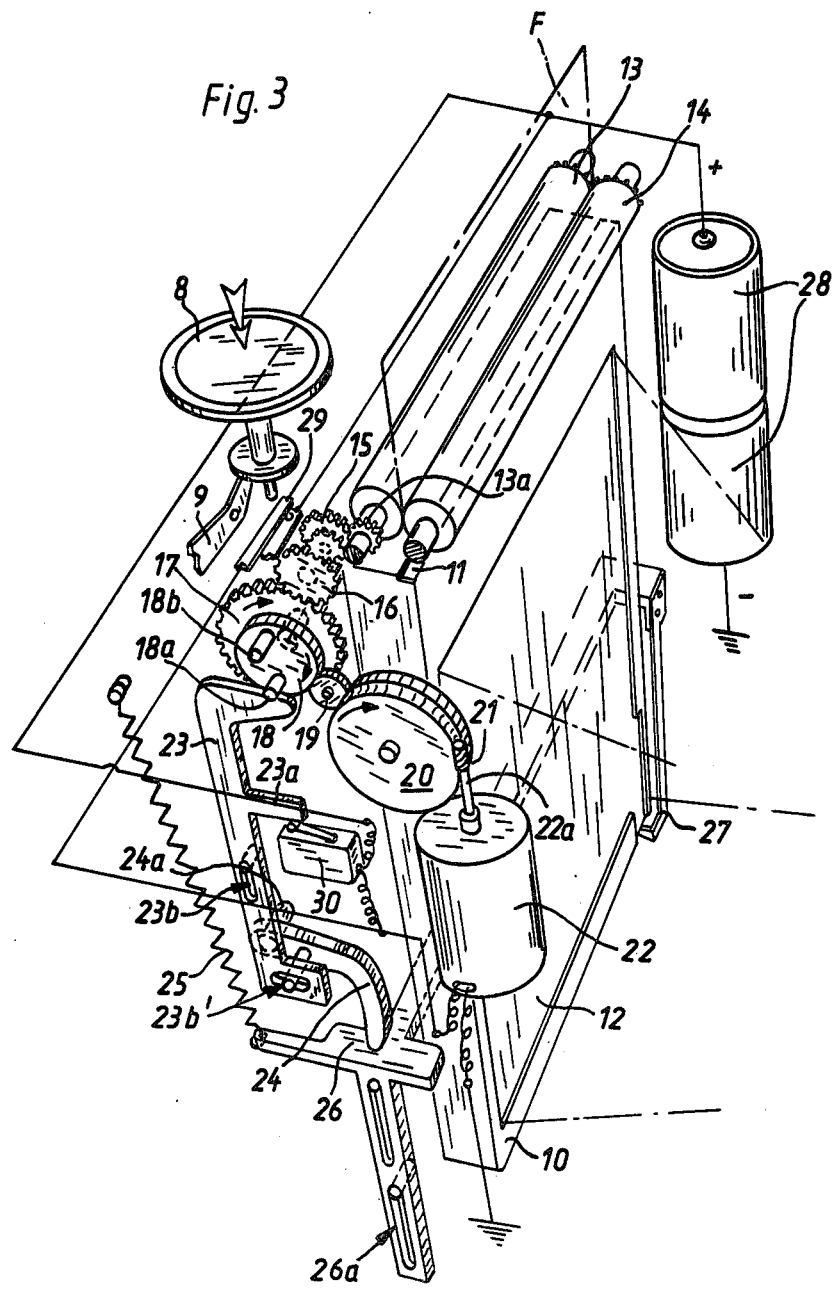
FIG. 3 is a perspective view showing details of the drive and motion-transmitting arrangement of the camera in FIGS. 1 and 2, the housing being omitted for clarity of illustration.

In the embodiment illustrated in FIGS. 1-3 the camera has a flat, substantially box-shaped housing 1, the front side of which is provided with a recess R. This recess is flanked at its opposite lateral sides by a camera-drive (motor) compartment 1a and a battery compartment 1b, respectively, both of these compartments being provided in the housing 1. A lens mount 2 carries the lens 3 (and the not illustrated shutter-mechanism for the same); it is connected to the housing 1 by means of a conventional bellows 5 (of rubberized fabric, synthetic plastic material or the like) and an upper and a lower pantograph linkage (only the upper is visible) so that it can be extended to the illustrated operating position or else retracted into the recess R in its rest position. The upper part of housing 1 is also provided with a viewfinder 6 (known per se) and with a discharge slot 7 through which exposed and developing or developed film sheets F are expelled to the exterior of the camera. In FIG. 2 the pantograph linkages are omitted for clarity.

The battery compartment 1b is provided with a cover by means of which it is accessible from the exterior of the housing 1 (e.g., the rear thereof); it is closed off with respect to the interior of the housing 1 so as to prevent the entry of light into the interior when the cover is removed. Thus, the battery compartment 1b can be opened even when a film cassette 10 is in position within the camera.

Since the portions of housing 1 which accommodate the compartments 1a, 1b are located at opposite lateral sides of the recess R (and hence of the lens mount 2), they can be gripped by the hands of a user and thus serve to hold the camera steady (instead of being merely added bulk as in the prior art). A shutter release button or analogous element 8 is provided on the housing 1, so located as to be handy for engagement by a finger of a user who grips the camera by the portions which house the compartments 1a, 1b. When depressed, the button 8 acts upon electrical or mechanical (shown) means 9 which are not shown in detail (known per se) and which in turn trigger the shutter release of the camera.

Located in the housing 1 (omitted in FIG. 3) is the film cassette 10 having its own film-sheet discharging slot 11 directed upwardly towards the slot 7 (FIG. 1). The open side or film exposure window 12 of the cassette 10 faces (when the cassette is installed in the housing) forwardly towards the lens 3 or lens mount 2. A pair of nip rollers 13, 14 is arranged below the slot 7, so as to be located above the slot 11 of the cassette 10; these rollers transport the film sheets F out of the camera housing 1 and, while the film sheets pass through the nip, these rollers also squeeze developer from a pouch provided on each film sheet and spread it over the exposure area of the film sheet.

Roller 13 carries on its shaft a pinion 13a (this could evidently be on roller 14, if desired). Pinion 13a is driven by a gear train 15, 16, 17, 18, 19, 20 which receives its motion from a worm 21 mounted on the output shaft 22a of an electric motor 22 (in compartment 1a). The element 18 of the train is a disc which carries two axially projecting pins 18a and 18b; these are offset from one another circumferentially of disc 18 by 180°. A slidable member 23 is connected to the housing by a pin-and-slot guide 23b; one of its ends (the upper one) abuts one of the pins on disc 18 (here the pin 18a) when the film transporting mechanism is in the illustrated starting position. The other end of member 23 is connected to a curved lever 24 via another pin-in-slot guide 23b'; lever 24 is pivoted to the housing at 24a. A free end of lever 24 abuts a slidable member 26 which is connected to the housing by a pin-and-slot guide 26a and is permanently biased towards the rollers 13, 14 by a spring 25. When member 23 moves upwardly the member 26 follows it; due to the pivoting of lever 24 at 24a and due to the pin-and-slot guide 23b' the lever 24 converts a relatively short upward displacement of member 23 into a longer upward displacement of member 26. The member 26 is in form of a bracket which extends behind the cassette 10 and is provided with an engaging portion (or claw) 27 which in a manner known per se engages the trailing edge of that film sheet F in cassette 10 that is located closest to window 12, to push the film sheet upwardly.

Motor 22 receives its electrical energy from a two-cell battery 28 (evidently, the number of cells or of batteries could be different) with which it is connected by an electrical circuit having the illustrated two branches. One of these branches has the diagrammatically illustrated contact 29 (e.g., a microswitch) interposed in it which is actuated by operation of the shutter release 8. The other branch has a contact 30 (another microswitch) interposed in it which is of the normally closed type but is maintained in open-circuit condition by an arm 23a of member 23 when the arrangement is in the position of FIG. 3.

THE OPERATION OF FIGS. 1-3

When the arrangement is in the starting position of FIGS. 1-3 and the shutter relase 8 is pushed, the linkage 9 triggers the camera shutter so that the film sheet F closest to the window 12 is exposed with scene light. Subsequent to this, the contact 29 is closed and the motor 22 is briefly energized. It should be noted that the contact 29 will preferably not be directly operated by the release 8 but will be so located as to be closed by an element of the triggered shutter instead. In any case, motor 22 rotates and turns the worm 21, thereby rotating the disc 18 in clockwise direction. As pin 18a recedes upwardly away from the member 23, the latter (and with it the member 26) follows it under the force of spring 25. Since claw 27 is part of member 26, it moves upwardly also and pushes the leading (upper) end of the film sheet F in the nip of rollers 13, 14. During this phase of the movement, when the film sheet is not yet in the nip, rollers 13, 14 idle and the upward force for movement of the jaw 27 is supplied by spring 25; therefore, the motor 22 (which is just starting up) is not required to supply much torque at this time.

As member 23 moves upwardly the arm 23a moves with it, until it disengages from the plunger of microswitch 30 so that the same can now close and energy is supplied to motor 22 via the second circuit branch. As soon as this takes place, supply of energy via the first branch is interrupted (this function could also be carried out by switch 30). During the further rotation of disc 18 the lower end of the slot of guide 23b abuts the stationary pin which extends into the slot; this terminates the upward movement of member 23. The rollers 13, 14 now receive the full torque of the motor 22 and transport the film sheet F upwardly out of slot 7.

Subsequently, the pin 18b moves into engagement with the upper end of member 23 and pushes it (and member 26) downwardly to the illustrated starting position, at the same time tensioning the spring 25. The precise moment at which this reversal of the movement begins depends upon the construction of the gear train; preferably it should not begin until the film sheet F is fully expelled.

If desired, the disc 18 could have a single pin (18a or 18b) instead of two of them. The transmission ratio between the angle of displacement of the disc 18 and the angle of displacement of rollers 13, 14 will then only be of half the magnitude as if two pins are used. However, the illustrated embodiment using two pins is currently preferred because it makes it possible to use the arrangement even without the motor, if desired, merely by replacing the motor 22 and the gear train 19, 20, 21 with a film advancing lever that is connected to the disc 18 and able to rotate it when the advancing lever is pivoted through 180°.

THE STRUCTURE OF FIGS. 4–5

This embodiment is basically very similar to that in FIGS. 1–3. Therefore, like reference numerals have been used to identify like elements and a detailed description of these elements is not provided.

Figure 4:
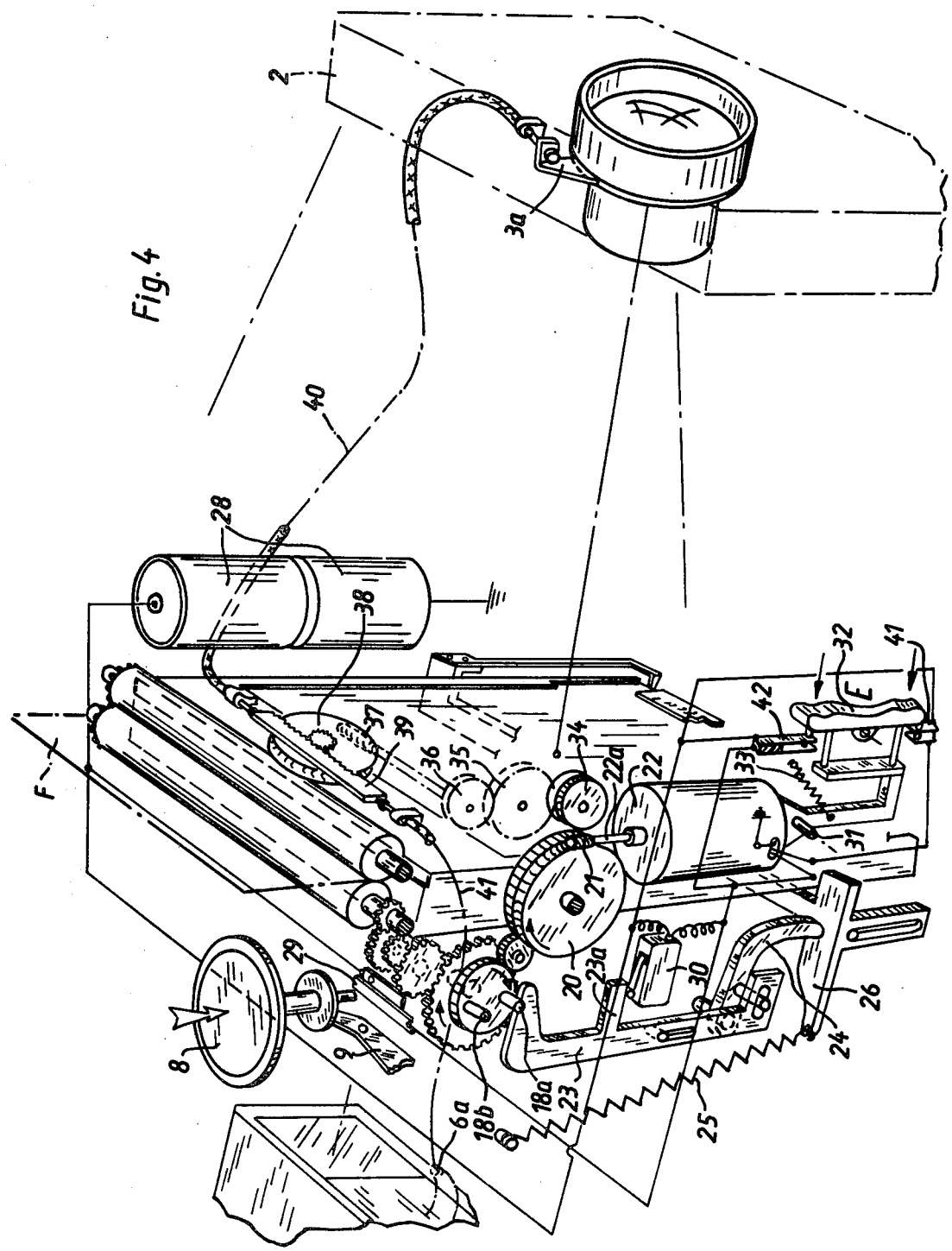
FIG. 4 is a view similar to that of FIG. 3, but showing a somewhat different embodiment.
Figure 5:
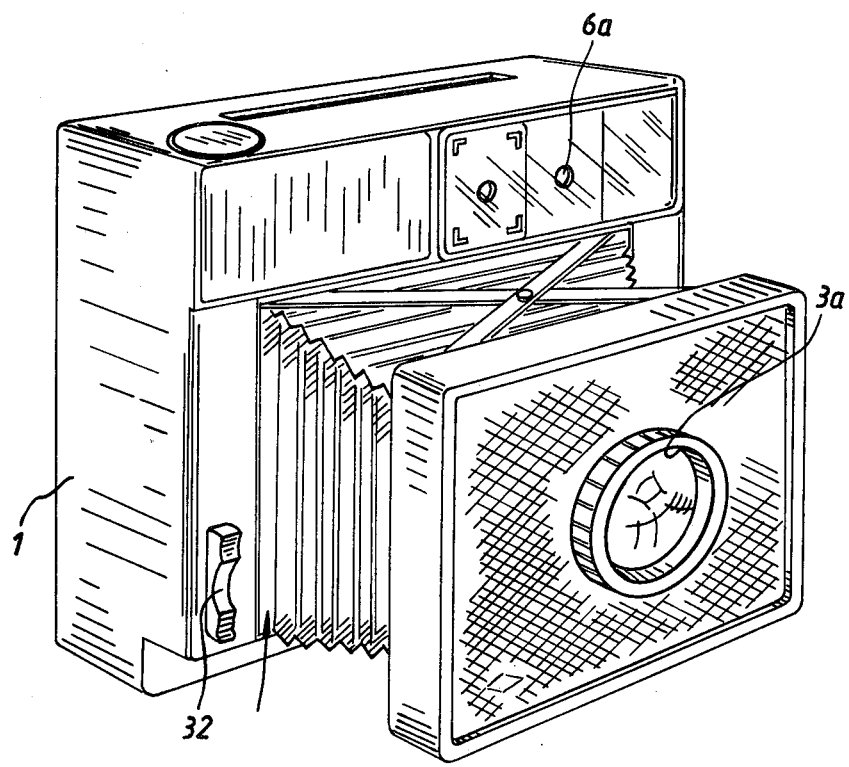
FIG. 5 is a perspective view showing the camera in accordance with the embodiment of FIG. 4 in operative position.

The embodiment of FIGS. 4–5 differs from the preceding one in the provision of a motor drive for focussing, e.g., for a zoom lens provided on the camera.

For this purpose the motor 22 is here mounted in the housing so that it can tilt about the axis of a pivot 31. Such a tilting is effected by depressing a push button 32 (see also FIG. 5) counter to the action of a permanently acting restoring spring 33. A worm gear 34 is arranged adjacent the worm 21; when it is rotated in requisite direction, the worm gear 34 drives a gear train 35, 36, 37 and 38 which in turn axially shifts a rack 39. An end of a Bowden linkage 40 is connected to one end of the rack 39; its other end is connected to the lens 3a which may be of the zoom type and has its focus changed (i.e., is zoomed in or out) depending upon whether the Bowden linkage 40 is extended or retracted. The other end of rack 39 is connected to one end of a second Bowden linkage 41 whose other end is in turn connected with a component of the viewfinder 6a (e.g., to adjust a distance-setting indicator or to move a distance-indicating dial which is visible in the viewfinder 6a to a user. The purpose is to adjust the viewfinder in synchronism with the lens (or to at least provide different distance data); how this is done is known per se.

The pushbutton 32 is a rocker button, i.e., depending upon which of its ends is depressed either the contacts 41 or the contacts 42 will be closed. Closing of one contact causes the motor 22 to rotate in its normal direction; closing of the other contact causes the (direction-reversible) motor to rotate in the opposite direction.

THE OPERATION OF FIGS. 4–5

As to the film transportation, the operation is the same as in FIGS. 1–3. It differs only when the user wishes to change focus, e.g., to zoom his lens 3a. For this he views the scene through the viewfinder 6a and depresses the button 32, thereby causing the motor 22 to tilt about pivot 31 so that worm 21 disengages from worm wheel 20 and meshes with worm wheel 34. Depending upon whether the user exerts pressure upon the upper or the lower end of button 32, the motor 22 will rotate either in a sense zooming the lens 3a inwardly or outwardly; at the same time the corresponding viewfinder adjustment takes place via Bowden linkage 41.

This embodiment has the advantage that the use of the camera is further simplified. When the lens and viewfinder are to be readjusted it is no longer necessary to release the camera with one hand and to turn a focussing ring of the lens as in the prior art. Also, instead of requiring shifting of the lens mount in toto with the lens thereon, a more precise setting of the lens can be obtained. In addition, the pantographs can be simpler because they are not involved in these adjustments, and the previously necessary arrangement for guiding the lens mount during such displacement in precise parallelism with the plane of the film sheet over the entire focussing range, is eliminated so that costs are saved.

While the invention has been illustrated and described as embodied in a collapsible instant-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A camera, particularly an instant-picture camera, comprising a camera housing having a front side provided with a recess; a camera-drive compartment and a battery compartment flanking said recess at opposite lateral sides thereof; a lens mount connected to said camera housing and movable relative to the same between an extended position in which the lens mount is located forwardly of said front side, and a retracted position in which the lens mount is retracted into said recess of said front side and is located between said compartments; film transporting means in said camera housing and including a pair of nip rollers, a film engaging member spaced from and movable towards and away from said rollers so as to engage a film and push it into the nip of said rollers, an electric motor in said camera-drive compartment, and a motion-transmitting arrangement driven by said motor and connected with said film engaging member and at least one of said rollers for driving the same; a shutter release; and electric circuit means connecting said motor with at least one battery in said battery compartment and including two parallel circuit branches, a first switch in one of said branches and actuated by operation of said shutter release to temporarily supply electrical energy to said motor via said one branch, and a second switch in the other of said branches and operated by said motion-transmitting arrangement to supply electrical energy to said motor via said other branch subsequent to termination of the supply via said one branch.

2. A camera as defined in claim 1; further comprising means for deactivating said second switch after completion of film transportation by said rollers.

3. A camera, particularly an instant-picture camera, comprising a camera housing having a front side provided with a recess; a camera-drive compartment and a battery compartment flanking said recess at opposite lateral sides thereof; a lens mount connected to said camera housing and movable relative to the same between an extended position in which the lens mount is located forwardly of said front side, and a retracted position in which the lens mount is retracted into said recess of said front side and is located between said compartments; a variable-focus lens on said lens mount; a film transporting mechanism in said camera housing; drive means for driving said film transporting mechanism, including a direction-reversible electric motor in said camera-drive compartment; and lens adjusting means operatively connected with said lens and including means for selectively connecting said motor with said lens adjusting means and for operating said motor in one or in an opposite direction of rotation.

4. A camera as defined in claim 3, wherein said camera housing is of flat box-shaped configuration.

5. A camera as defined in claim 3, said camera housing having an upper end provided with a film discharge slot, and said nip rollers being arranged below and proximal to said slot.

6. A camera as defined in claim 3, said means for selectively connecting and operating comprising an elongated button mounted to be depressed inwardly of said camera housing to connect said motor with said lens adjusting means, said button also having spaced ends and being rockably mounted to effect rotation of said motor in said one or in said opposite direction in dependence upon which of said spaced ends is depressed.

* * * * *